United States Patent [19]

Yamada et al.

[11] Patent Number: 4,680,449

[45] Date of Patent: Jul. 14, 1987

[54] HEATER FOR HEATING HEAT SHRINKABLE TUBE

[75] Inventors: Takeshi Yamada, Sakura; Yasukuni Osato, Narashino; Okosu Watanabe, Chiba, all of Japan

[73] Assignee: Fujikura Ltd., Tokyo, Japan

[21] Appl. No.: 787,821

[22] Filed: Oct. 15, 1985

[30] Foreign Application Priority Data

Oct. 19, 1984 [JP] Japan ................................ 59-219786

[51] Int. Cl.$^4$ ............................................. F27D 11/00
[52] U.S. Cl. ..................................... 219/385; 219/443; 219/455; 219/457; 264/1.5; 264/25; 264/2.7; 174/DIG. 8
[58] Field of Search ............... 219/385, 443, 448, 455, 219/457, 459, 512, 358; 264/1.5, 25, 2.7; 174/16 HS, DIG. 8

[56] References Cited

U.S. PATENT DOCUMENTS

| | | | |
|---|---|---|---|
| 3,995,141 | 11/1976 | Vieau et al. ........................ | 219/521 |
| 4,312,012 | 1/1982 | Frieser et al. .................. | 174/16 HS |
| 4,460,820 | 7/1984 | Matsumoto et al. ................ | 219/385 |
| 4,526,732 | 7/1985 | Kakii et al. ........................... | 264/2.7 |

Primary Examiner—E. A. Goldberg
Assistant Examiner—Lincoln Donovan
Attorney, Agent, or Firm—Armstrong, Nikaido, Marmelstein & Kubovcik

[57] ABSTRACT

A heater for heating a heat shrinkable tube fitted over an elongated member includes a base having an elongated support plate of a thermally conductive material for supporting the heat shrinkable tube on one surface thereof. The support plate has a heating portion at a central portion thereof. The heat shrinkable tube is adapted to be placed on the support plate along a length thereof with the opposite end portions of the tube disposed outwardly of the opposite ends of the heating portion, respectively. A heating element is disposed in contact with the other surface of the support portion and disposed in registry with the heating portion. The heating element is operable to first heat the heating portion and then the opposite end portions of the support portion extending outwardly from the opposite ends of the heating portion through heat transfer, so that the heat shrinkable tube is heat shrunk from its central portion toward the opposite ends thereof.

6 Claims, 15 Drawing Figures

Before shrinkage 1 minute 2 minutes 3 minutes 4,680,449

HEATER FOR HEATING HEAT SHRINKABLE TUBE

BACKGROUND OF THE INVENTION

1. Field of the Invention

This invention relates to a heater for heating a heat shrinkable tube fitted over a junction between optical fiber cables or electric cables.

2. Prior Art

FIG. 1 shows one conventional heater 100 of the type described which comprises a rectangular base 102, a pair of support members 104 and 104 fixedly mounted on a top surface of the base 102 at opposite ends thereof, a pair of parallel spaced shield plates 106 and 106 fixedly mounted on the top surface of the base 102 and disposed between the pair of support members 104 and 104, and three electric heating elements 108a, 108b and 108a disposed between the pair of shield plates 106 and 106 and spaced therealong. In operation, a heat shrinkable tube 110 is fitted over two optical fiber cables 112 and 112 to cover a junction 114 between their conductors 116 and 116. Then, the two optical fiber cables 112 and 112 are placed on the pair of support members 104 and 104 with the heat shrinkable tube 110 disposed above the three heating elements 108a, 108b and 108a. Then, the heating elements 108a, 108b and 108a are operated to heat the heat shrinkable tube 110 so that the tube 110 is shrunk radially inwardly to seal the joint 114. During this heating operation, if the opposite end portions of the heat shrinkable tube 110 are first shrunk, air is entrapped in the central portion of the tube 110 intermediate the opposite end portions. Such residual or entrapped air affects the reinforcement of the cable joint portion by the tube 110. Therefore, it is necessary to shrink the heat shrinkable tube 110 from the central portion toward the opposite end portions. One method is to heat the central heating element 108a at a temperature slightly higher than the temperature at which the other two heating elements 108a and 108a are heated. Another alternative is to first heat the central heating element 108b for a predetermined period of time to shrink the central portion of the tube 110 and then to start the heating of the other two heating elements 108a and 108a to shrink the opposite end portions of the tube 110. Thus, two kinds of heating elements to be operated at different heating temperatures are required for carrying out the former method. And, the latter method requires the three heating elements and a timer means for sequentially operating them in a manner described above. Therefore, the conventional heater is rather complicated in construction and expensive.

SUMMARY OF THE INVENTION

It is therefore an object of this invention to provide a heater for heating a heat shrinkable tube fitted over an elongated member which heater is simple in construction and less expensive to manufacture.

According to the present invention, there is provided a heater for heating a heat shrinkable tube fitted over an elongated member which heater comprises:

(a) a base having an elongated support plate of a thermally conductive material for supporting the heat shrinkable tube on one surface thereof, said support plate having a heating portion at a central portion thereof, the heat shrinkable tube being adapted to be placed on said support plate along a length thereof with the opposite end portions of the tube disposed outwardly of the opposite ends of said heating portion, respectively; and (b) a heating element disposed in contact with the other surface of said support portion and disposed in registry with said heating portion, said heating element being operable to first heat said heating portion and then the opposite end portions of said support plate extending outwardly from said heating portion through heat transfer, so that the heat shrinkable tube is heat shrunk from its central portion toward the opposite ends thereof.

DESCRIPTION OF THE PREFERRED EMBODIMENTS OF THE INVENTION

Figure 1:
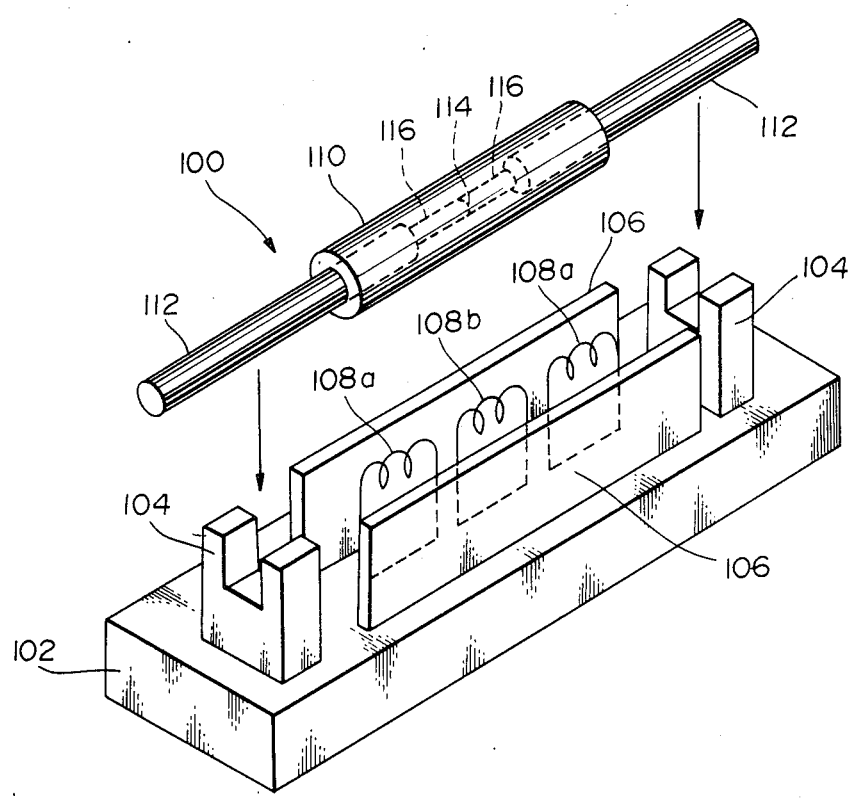
FIG. 1 is a perspective view of a heater provided in accordance with the prior art.

A heater 10 shown in FIGS. 2 to 5 comprises an elongated box-shaped base 12 made of a thermally-conductive sheet such as a stainless steel sheet, a pair of opposed elongated plates 14 and 14 fixedly mounted on an outer surface of a top wall or support plate 12a of the base 12 in parallel spaced relation to each other and extending along an entire length thereof, and an elongated heating element 16 of a rectangular shape fixedly mounted on an inner surface of the top wall 12a and held in contact therewith, the heating element 16 being disposed intermediate opposite ends of the base 12. Therefore, that portion of the top wall 12a with which the heating element 16 held in contact serves as a heating portion 12b. A pair of integral mounting lugs 18 and 18 of stainless steel are extend perpendicularly from the opposite end walls 12d and 12d, respectively. The heater 10 is adapted to be mounted on a suitable support through the mounting lugs 18 and 18.

The heating element 16 comprises a positive temperature coefficient thermistor (PTC thermistor) of which resistance increases with an increase of its temperature and increases abruptly when the temperature reaches a predetermined level so that the temperature increase is substantially stopped. Such a PTC thermistor is also known as "posistor" in the trade. One example of such a PTC thermistor is a barium titanate-based semi-conductor. The heating element 16 may be of any other suitable type such as a heating resistor composed of a nichrome wire.

Figure 6:
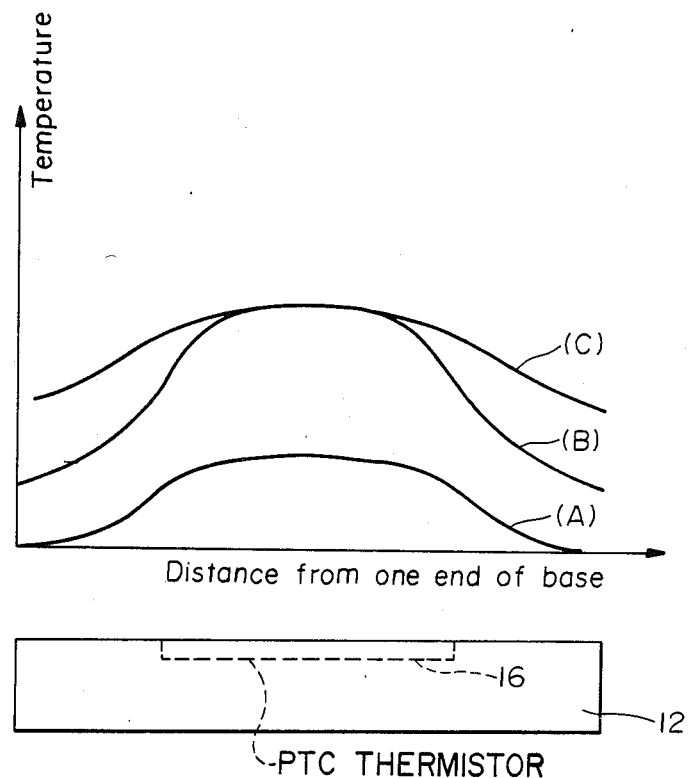
FIG. 6 is a diagrammatical illustration showing temperature profiles of a top wall of a base of the heater of FIG. 2 in accordance with the time of heating.
Figure 7A:
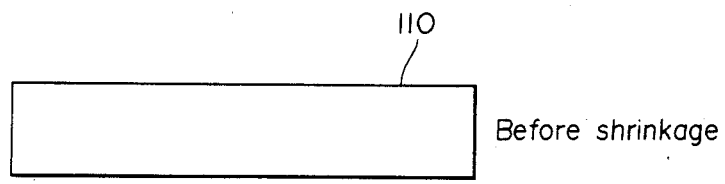
FIGS. 7(a) to 7(d) are schematic views showing a sequential shrinkage of a heat shrinkable tube heated by the heater of FIG. 2.
Figure 7B:
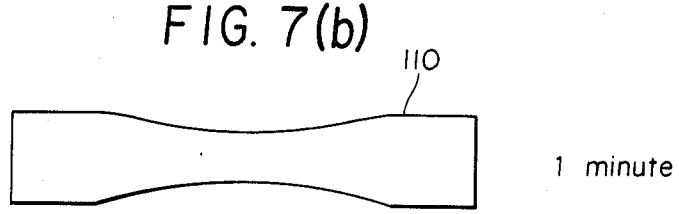
Figure 7C:
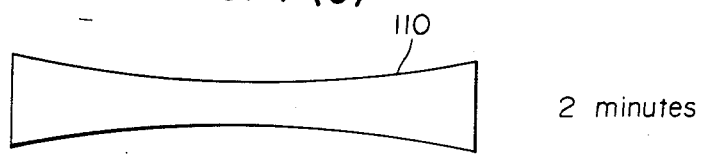
Figure 7D:
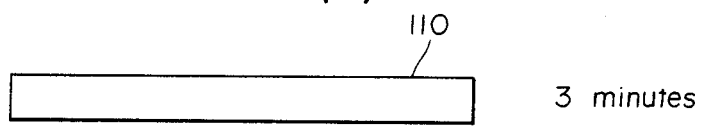

In operation, a heat shrinkable tube 110 is fitted loosely over two optical fiber cables 112 and 112 to cover a junction between their fibers 116 and 116. Then, the two connected optical fiber cables 112 and 112 are placed on the base top wall 12a and fitted in between the pair of elongated plates 14 and 14 with the opposite end portions of the heat shrinkable tube 110 disposed outwardly of the heating portion 12b of the top wall 12a. In this condition, the heat shrinkable tube 110 is held in contact with the opposed plates 14 and 14. Then, the heating element 16 is energized so that it is heated to heat the heating portion 12b of the top wall 12a for shrinking the heat shrinkable tube 110 radially inwardly. At this time, the opposite end portions 12d and 12d of the top wall 12a disposed outwardly of the heating portion 12b of the top wall 12a are not yet heated as indicated by a curve A in FIG. 6. Subsequently, the heat generated by the heating element 16 begins to be transferred toward the opposite ends of the top wall 12a and the temperature of the heating element 16 reaches the predetermined level, so that the temperature of the heating portion 12b also becomes substantially constant as indicated by a curve B in FIG. 6. In this condition, the opposite end portions 12d and 12d of the top wall 12a have not yet reached a predetermined level. Subsequently, the opposite end portions of the top wall 12a reach the predetermined level through the heat transfer as indicated a curve C in FIG. 6, and at this time the temperature profile of the top wall 12a becomes substantially constant. In this case, the temperature of the top wall 12a at any given point along the length of the top wall 12a is substantially uniform in a transverse direction, and therefore this does not need to be considered. The pair of elongated plates 14 and 14 held in contact with the heat shrinkable tube 110 assist in the heat shrinkage of the tube 110. The inner surfaces of the opposed elongated plates 14 and 14 and that portion of the top wall 12a lying between the opposed plates 14 and 14 are coated with polytetrafluoroethylene to prevent the heat shrinkable tube 110 and the optical fiber cables from being fused thereto during the heating operation.

With this method, the heat shrinkable tube 110 is shrunk radially inwardly first at its central portion and then at its opposite end portions as shown in FIGS. 7(a) to 7(d), so that the tube 110 is fitted tightly over the joint portion between the two optical fiber cables 112 and 112. Thus, since the heat shrinkable tube 110 is heat shrunk from its central portion toward its opposite ends, no air is entrapped in the shrunk tube 110.

The pair of mounting lugs 18 and 18 can serve as radiator means for radiating the heat for lowering the temperature of the opposite end portions 12d and 12d of the top wall 12a. In this case, the mounting lugs 18 and 18 are mounted directly on the heat conductive support. On the other hand, if it is desired to maintain the opposite end portions of the top wall 12a at higher temperatures, the mounting lugs 18 and 18 are mounted on the support through a thermal insulating material.

EXAMPLE

Figure 8:
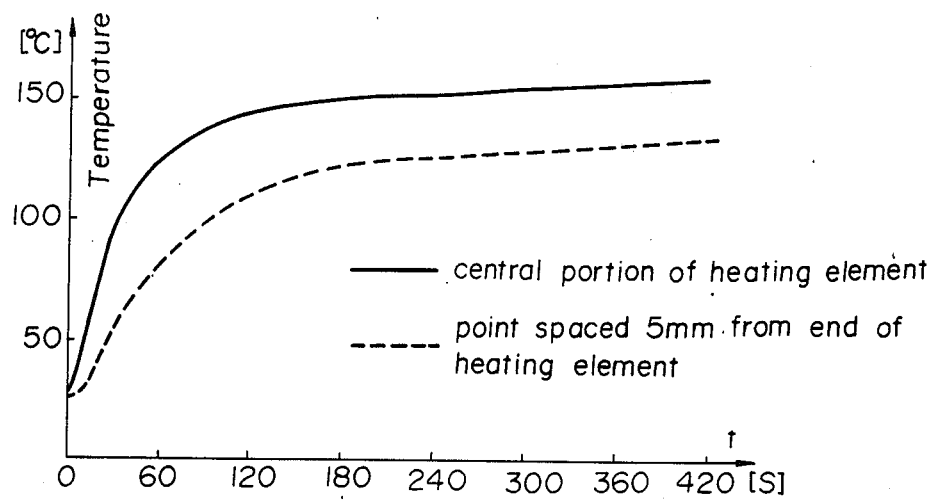
FIG. 8 is a diagrammatical illustration showing a temperature increase at the central portion of the top wall of the base and the temperature increase at points of the top wall spaced 5 mm outwardly respectively from the opposite ends of a heating element of the heater of FIG. 2.
Figure 9:
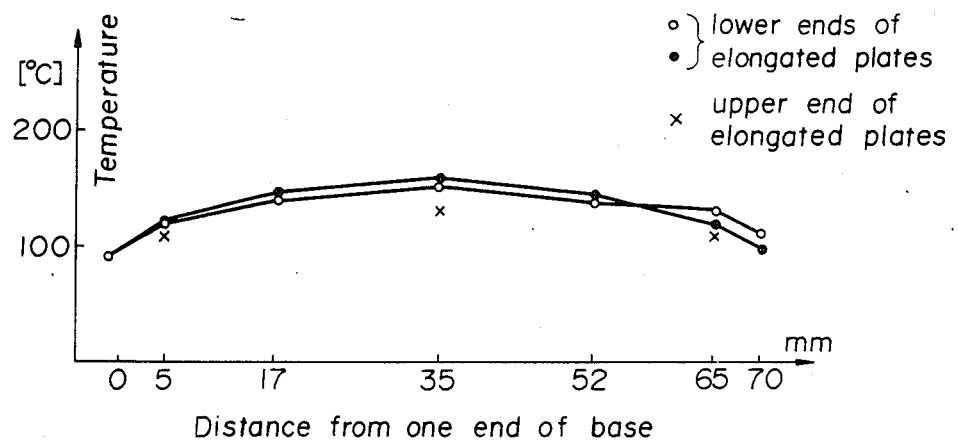
FIG. 9 is a diagrammatical illustration showing temperature profiles of the lower ends of elongated plates of the base in the direction of a length thereof as well as a temperature profile of the upper end of each elongated plate five minutes after the heating element is heated.

The heat shrinkage of the heat shrinkable tube 110 fitted over two optical fiber cables was carried out using the heater 10 of FIG. 1 for experimental purposes. The base 12 had a length of 70 mm, a width of 20 mm, and a height of 9 mm. Each of the elongated plates 14 and 14 had a length of 70 mm and a height of 8 mm. The heating element 16 had a length of 50 mm and a width of 20 mm. Each of the mounting lugs 18 and 18 has a square shape one side of which was 15 mm. The heat shrinkable tube 110 had a length of 60 mm, an inner diameter of 1.5 mm and an outer diameter of 4 mm. The base 12, the pair of elongated plates 14 and 14 and the pair of mounting lugs 18 and 18 were made of a stainless steel sheet having a thickness of 0.5 mm. The results obtained are shown in FIGS. 8 and 9. FIG. 8 shows the temperature increase at the central portion of the top wall 12a disposed in registry with the central portion of the heating element 16 and the temperature increase at the opposite end portions of the top wall 12a, that is, at points of the top wall 12a spaced 5 mm outwardly from the opposite ends of the heating element 16. FIG. 9 shows temperature profiles of the lower ends of the elongated plates 14 and 14 in the direction of a length thereof as well as a temperature profile of the upper end of each elongated plate 14 five minutes after the heating element 16 is heated. As can be seen from FIG. 8, the temperature difference between the central portion of the top wall 12a and the opposite end portions of the top wall 12a becomes substantially constant about one minute after the heating element 16 is heated. Also, as can be seen from FIG. 9, the temperature gradient of the top wall 12a from its central portion toward its opposite end portions is substantially constant. Therefore, the heat shrinkable tube 110 was suitably shrunk from its central portion toward its opposite end portions.

Figure 2:
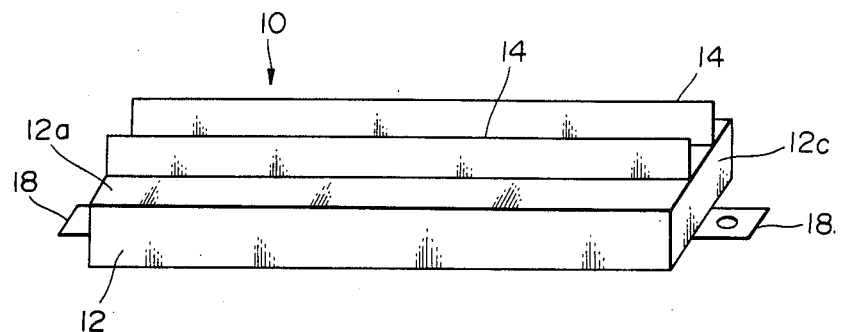
FIG. 2 is a perspective view of a heater provided in accordance with the present invention.
Figure 3:
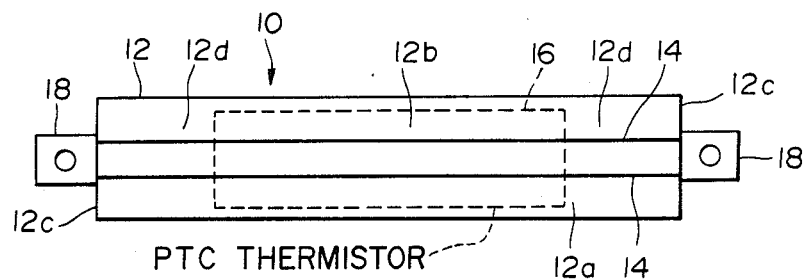
FIG. 3 is a top plan view of the heater of FIG. 2.
Figure 4:
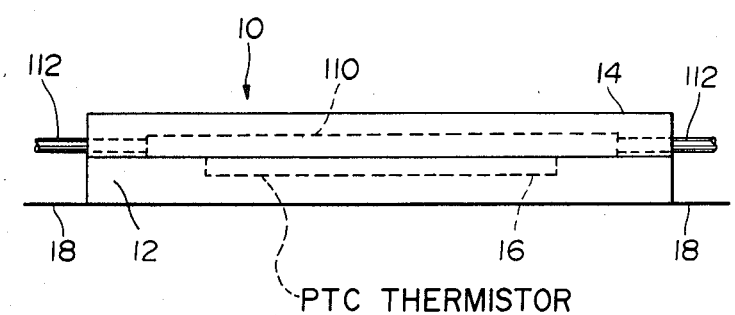
FIG. 4 is a side elevational view of the heater of FIG. 2.
Figure 5:
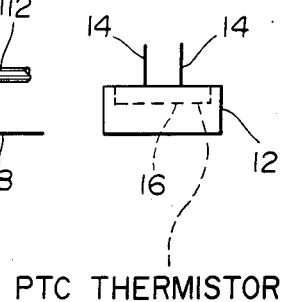
FIG. 5 is an end view of the heater of FIG. 2.
Figure 10:
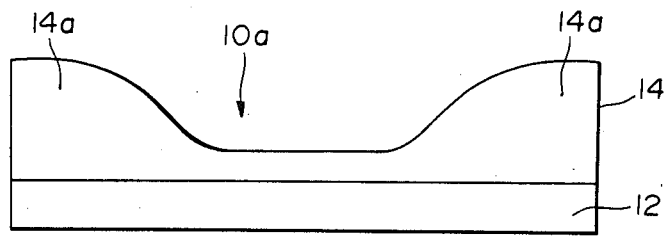
FIG. 10 is a side elevational view of a modified heater.

FIG. 10 shows a modified heater 10a which differs from the heater 10 of FIG. 2 in that each of opposed elongated plates 14 and 14 has enlarged opposite end portions 14a and 14a which serve as radiator means for radiating the heat.

Figure 11:
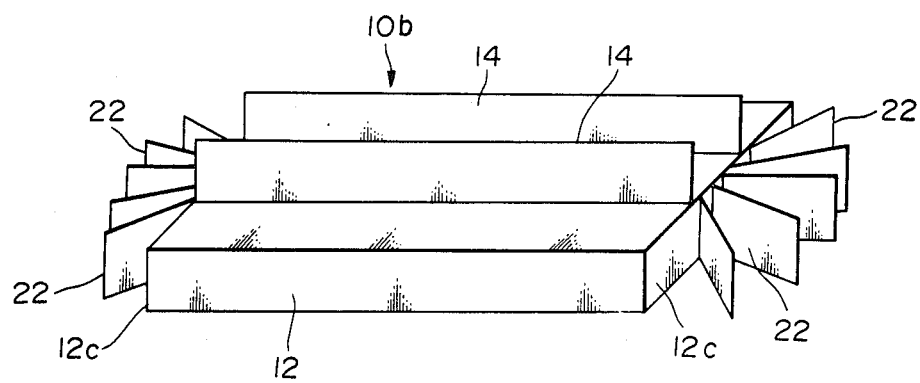
FIGS. 11 and 12 are views similar to FIG. 2 but showing further modified heaters, respectively.

FIG. 11 shows another modified heater 10b which differs from the heater 10 of FIG. 2 in that a plurality of fins 22 of stainless steel are formed on and extend outwardly from each of opposite end walls 12c and 12c of the base 12 so as to serve as radiator means for radiating the heat.

Figure 12:
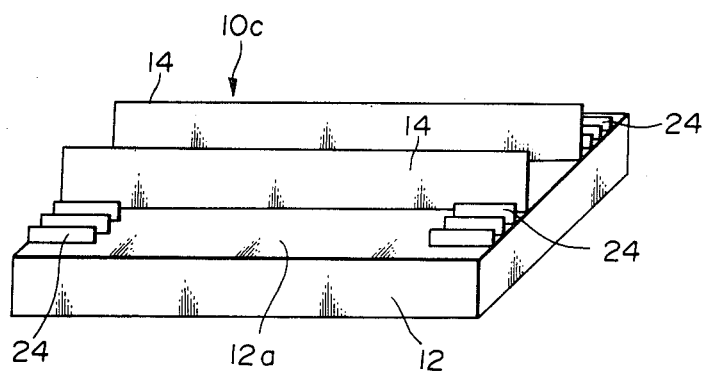

FIG. 12 shows a modified heater 10c which differs from the heater 10 of FIG. 2 in that a plurality of juxtaposed fins 24 of stainless steel are formed on the top wall 12a on each of four corner portions thereof.

What is claimed is:

1. A heater for heating a heat shrinkable tube fitted over an elongated member, which heater comprises:
    (a) a base having an elongated support plate of a thermally conductive material, adapted to support said elongated member carrying said heat shrinkable tube;
    (b) a first heating portion at a central portion of said support plate defined by the presence of a heater element attached to the underside of said support plate;
    (c) a second heating portion on said support plate defined by the end portions of said support plate extending outwardly in opposite directions from said first heating portion;

(d) a third heating portion defined by a pair of parallel spaced upright plates of thermally conductive material disposed on the top of said support plate and extending across said first heating portion coextensive with said support plate;

(e) whereby when said heater element is activated heat is transferred to said support plate, the central portion of said heat shrinkable tube above said first heating portion is heated first, so that said tube is heat shrunk at its central portion first and then towards its opposite ends.

2. A heater according to claim 1, in which said heating element comprises a positive temperature coefficient thermistor (PTC thermistor) of which resistance increases with an increase of its temperature and increases abruptly when the temperature reaches a predetermined level so that the temperature increase is substantially stopped.

3. A heater according to claim 1, in which said base is of an elongated box-shaped base having a top wall serving as said support plate and is made of a thermally-conductive sheet, said base having a pair of parallel opposed elongated plates of a thermally conductive material fixedly mounted on said one surface of said support portion and extending along a length thereof, the heat shrinkable tube being adapted to be fitted between said pair of elongated plates.

4. A heater according to claim 1, in which said support plate has a pair of radiator means provided respectively on the opposite ends thereof for efficiently radiating the heat transferred from said heating element, said radiator means comprising fins.

5. A heater according to claim 3, in which said base has a pair of end walls, said base having a pair of radiator means provided respectively on said end walls for efficiently radiating the heat transferred from said heating element, each of said radiator means comprising at least one fin.

6. A heater according to claim 3, in which each of said elongated opposed plates has enlarged end portions for enhancing the radiation of the heat transferred from said heating element.

* * * * *